Dec. 16, 1947.   L. OFFICE   2,432,674
GLARE SHIELD ATTACHMENT
Filed May 23, 1945
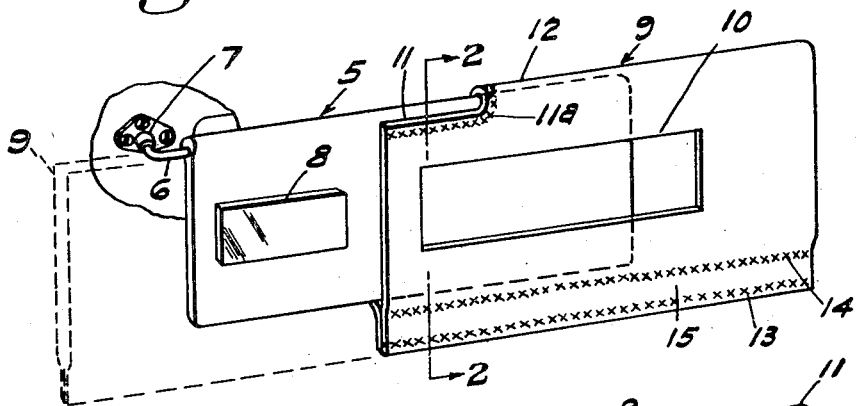
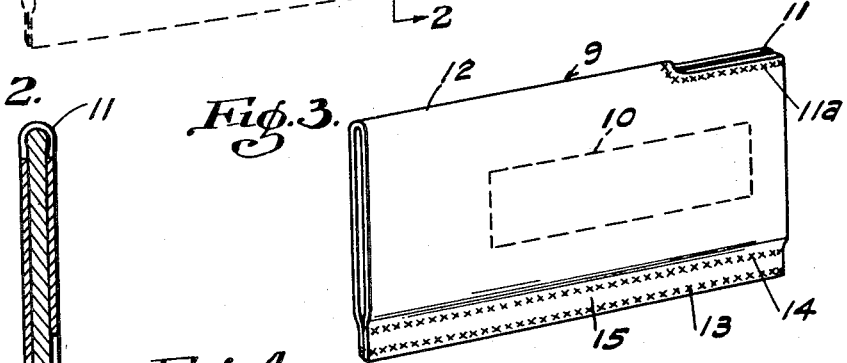
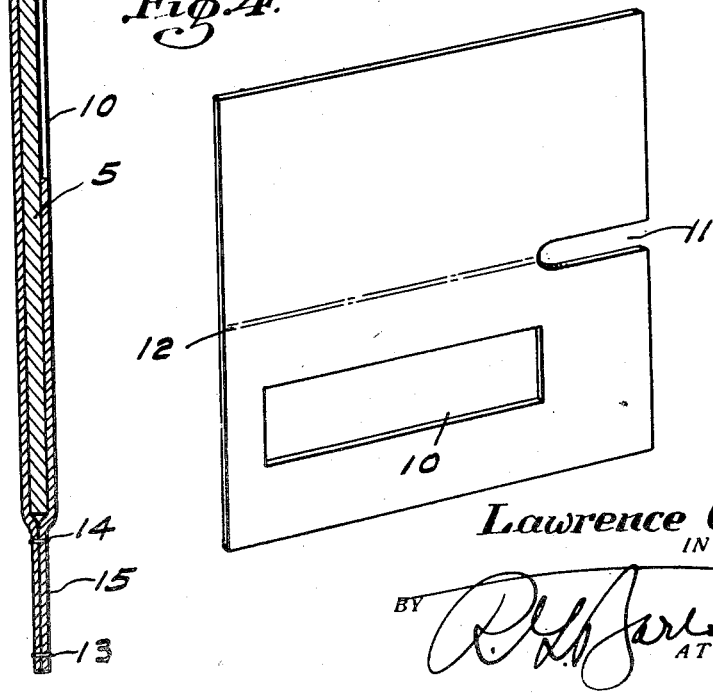
Lawrence Office,
INVENTOR
BY *R. L. Barlow*
ATTORNEY Patented Dec. 16, 1947

2,432,674

UNITED STATES PATENT OFFICE 2,432,674

GLARE SHIELD ATTACHMENT

Lawrence Office, Los Angeles, Calif.

Application May 23, 1945, Serial No. 595,412

1 Claim. (Cl. 296—97)

My invention relates to a glare shield attachment.

More particularly the invention relates to an envelope or sleeve for slipping over the usual glare shields now provided in automotive vehicles.

In making extensive tours in automotive vehicles wherein the driver is subjected to sun glare from various angles during the daytime driving, it is not infrequent that the glare shields now provided are not sufficiently adequate to obstruct sunbeams entering through the windshield from all directions, consequently at times the driver's eyes are subjected to the sun's rays necessitating the wearing of colored glasses thereby reducing the clarity of vision so necessary for safe driving.

It is one of the principal objects of this invention to provide an easily applied, easily adjusted rightwardly and leftwardly glare shield attachment which is reversible and adapted to be slipped over either the right or left hand glare shield mounted on the automotive vehicle.

Further objects include the provision of a glare shield attachment which, when extended in either direction in relation to a glare shield provides a pocket for the insertion and projection of a map easily viewed by the driver at any time of the driving period, and at the completion of the trip may be used as an auxiliary brief case simply by clipping the open ends thus providing a carry-all for numerous papers, letters or other information needed while making a stop-over or extended visit at a particular place.

A still further object is to provide a glare shield attachment of the utmost simplicity, one which can be manufactured with less cost, and with less endeavor due to the fact that it embodies only a folded strip of sheet material stitched along certain exposed edges, there being, along an edge portion of the sheet two parallel spaced apart rows of stitches which provide between them a convenient handhold for the driver to grasp when he adjusts the device.

Yet a further object is to provide a glare shield extension open at both ends and provided also with an open slit at one end in its top edge whereby, the attachment is afforded a greater range of adjustment because of said slit providing a clearance for the glare shield support.

Finally it is an object to provide in combination with a glare shield having a rear vision mirror mounted thereon, an envelope like attachment for said glare shield having through one of its walls a sight opening which at times uncovers said mirror to the vision of the driver and at one side of said opening adjacent the mirror a narrow strip of material which when projected over the mirror leaves visible the greater portion of the mirror.

Other objects, advantages and features of invention will hereinafter appear.

Referring to the accompanying drawing which illustrates what is at present deemed to be a preferred embodiment of the invention, Fig. 1 is a perspective view of the device showing the same applied to a mounted conventional glare shield. The article is shown in full lines adjusted near one limit of its travel, dotted lines indicating the position thereof at the opposite limit of its travel.

Fig. 2 is a section on an enlarged scale, the plane of section being indicated by the line 2—2 on Fig. 1.

Fig. 3 is a perspective view of the article separately shown.

Fig. 4 is an extended face view somewhat in perspective, of a single piece of sheet material of which the article is made, cut ready for folding into envelope form.

Referring in detail to the drawing, a conventional glare shield 5 is shown supported by the angular arm 6 which in turn is swingably carried by the bracket 7. Said glare shield is shown provided with an elongated rectangular rear vision mirror 8 which is directed toward the driver when the glare shield is in the down swung position.

The article to which the invention particularly pertains consists of an elongated, approximately rectangular envelope 9 which is contoured to fit around the glare shield for longitudinal adjustment therealong, said envelope having through one of its side walls a spacious rectangular opening 10 through which the mirror 8 is visible to the driver when the envelope is adjusted to the position indicated by the dotted lines in Fig. 1.

In order to make it possible to adjust said envelope to the limit of its travel toward the supported end of the glare shield 5 a slot or cut-away portion 11 reinforced by stitching 11a is provided along one end of the creased portion 12 of the envelope so as to provide a clearance for the attached portion of the angular arm 6, thus to unobstruct the movement of the envelope to the limit of its travel in that direction. Owing to both ends of the envelope being open the right end thereof as viewed in Fig. 1 may move to the left sufficiently to expose the right hand end portion of the glare shield when the adjustment is effected. Also when the envelope is adjusted to the right as shown in Fig. 1, the left hand end portion of the glare shield is exposed, as shown in said view.

In Fig. 4 which shows in an extended pre-cut condition the single piece of sheet material of which the envelope 9 consists, the cut-away portion 11 appears at one end of the fold line 12 and the sight opening 10 is shown extending through one only of the two wings of the sheet. Said opening 10 is shown nearer to the open end of the envelope adjacent the mirror 8 than to the opposite end thereby providing a narrow strip of material which when projected over the mirror leaves visible the greater portion of the mirror.

Referring now to Fig. 2 it will be seen that when the two equal wings of the sheet are folded over they are of sufficient width to extend considerably below the lower edge of the enclosed glare shield, thus making it possible to utilize not only a lower row of stitches 13, along the extreme edge portion of the sheet, but also in a parallel upwardly spaced relation to these stitches, to provide a row of stitches 14 adjacent to the lower edge of the enclosed glare shield. It will be seen that between said rows of stitches there is an extension 15 of the envelope which widens the area thereof and at the same time affords a convenient hand-hold for the driver to use in adjusting the envelope in the manner aforesaid.

It will be also observed that when the envelope 9 is adjusted to the right as shown in Fig. 1, not only is the rear vision mirror 8 observable to the driver but also the opening 10 is in a position to allow maps or other information bearing card-like objects to be slipped in behind the lower edge of said opening thus to be supported where they are readily kept under inspection by the driver.

It should be understood that the present disclosure is for the purpose of illustration only and that this invention includes all modifications and equivalents which fall within the scope of the subject matter claimed.

I claim:

An attachment for longitudinally enlarging the glare screening area of a vehicle sun visor of the type having a flat substantially rectangular body supported to assume a horizontally elongated screening position on a bracket attached to a vehicle, said visor body having a relatively small mirror fixed upon the side facing the interior of the screen, said attachment comprising a sheet of stiff material doubled upon itself and having the edge margins opposed to the folded edge stitched together to provide an open ended envelope loosely surrounding and of a length substantially corresponding to that of the visor, said envelope being provided with a longitudinally elongated opening in the inner wall in horizontal registration with the visor mirror and terminating closely adjacent one end of the envelope so as to maintain the mirror completely uncovered for the major portion of its range of adjustment and to cover but a relatively small area of the mirror during the remainder of the range of adjustment of the envelope, said envelope being adapted for longitudinal sliding adjustment to extended positions projecting beyond either end of the visor body to provide a glare screening area substantially greater than that of the visor itself, said glare screening envelope having a slot longitudinally inward of one end of the folded edge to clear the visor support bracket for extension of the glare screening area at the bracket end of the visor.

LAWRENCE OFFICE.

REFERENCES CITED

The following references are of record in the file of this patent:

UNITED STATES PATENTS

| Number | Name | Date |
| --- | --- | --- |
| 2,097,419 | Schmidt | Oct. 26, 1937 |
| 2,184,360 | Nichols | Dec. 26, 1939 |
| 2,185,898 | Mitchell | Jan. 2, 1940 |
| 2,238,981 | Newell | Apr. 22, 1941 |
| 2,382,875 | Handley | Aug. 14, 1945 |